US008863199B1

(12) United States Patent
Otto et al.

(10) Patent No.: US 8,863,199 B1
(45) Date of Patent: Oct. 14, 2014

(54) METHOD AND DEVICE FOR DISPLAYING INFORMATION WITH RESPECT TO SELECTED IMAGE ELEMENTS OF IMAGES OF A VIDEO SEQUENCE

(75) Inventors: Christian Otto, Hildesheim (DE); Frank Knischewski, Rheden (DE)

(73) Assignee: Frank Knischewski, Rheden (DE)

( * ) Notice: Subject to any disclaimer, the term of this patent is extended or adjusted under 35 U.S.C. 154(b) by 2395 days.

(21) Appl. No.: 10/111,234

(22) PCT Filed: Oct. 20, 2000

(86) PCT No.: PCT/EP00/10388
§ 371 (c)(1),
(2), (4) Date: Oct. 25, 2002

(87) PCT Pub. No.: WO01/30071
PCT Pub. Date: Apr. 26, 2001

(30) Foreign Application Priority Data

Oct. 21, 1999 (DE) .................................. 199 50 939
Jul. 7, 2000 (DE) .................................. 100 33 134

(51) Int. Cl.
*H04N 5/445* (2011.01)
(52) U.S. Cl.
USPC .................................. 725/60; 725/40; 725/61
(58) Field of Classification Search
CPC ....................... H04N 21/4722; H04N 21/4725
USPC ..................... 725/42, 43, 40, 60, 61
See application file for complete search history.

(56) References Cited

U.S. PATENT DOCUMENTS

| 5,539,871 A | 7/1996 | Gibson |
| 5,561,708 A * | 10/1996 | Remillard ................... 379/93.19 |
| 5,708,845 A | 1/1998 | Wistendahl et al. |
| 5,774,666 A | 6/1998 | Portuesi |
| 5,778,181 A | 7/1998 | Hidary et al. |
| 5,880,720 A * | 3/1999 | Iwafune et al. ................... 725/24 |
| 5,929,849 A | 7/1999 | Kikinis |
| 5,929,850 A | 7/1999 | Broadwin et al. |
| 6,282,713 B1 | 8/2001 | Kitsukawa et al. |
| 6,381,583 B1 * | 4/2002 | Kenney ........................... 705/26 |
| 6,496,981 B1 * | 12/2002 | Wistendahl et al. .......... 725/112 |
| 6,857,131 B1 * | 2/2005 | Yagawa et al. ................ 725/112 |

FOREIGN PATENT DOCUMENTS

| DE | 4427046 A1 | 2/1996 |
| EP | 0905669 A2 | 3/1999 |
| WO | WO 96/36007 A1 | 11/1996 |
| WO | 97/41690 | 11/1997 |

(Continued)

OTHER PUBLICATIONS

Official Action of the German Patent and Trademark Office, issued on Aug. 25, 2009 with respect to the parallel German patent Application No. 100 33 134.3.

*Primary Examiner* — Nasser Goodarzi
*Assistant Examiner* — Hyun Hong
(74) *Attorney, Agent, or Firm* — Dean Small; Jason P. Gross; The Small Patent Law Group LLC

(57) ABSTRACT

The invention relates to a method for displaying information with respect to selected image elements. The aim of the invention is to simplify the interactive work via, for example, a frame. To this end, an image element is selected from the images of a video sequence with which an information is associated. The selection proceeds partially via an additional image element or signal element that is likewise presented on the display unit that displays the frame.

26 Claims, 12 Drawing Sheets

(56) References Cited

FOREIGN PATENT DOCUMENTS

| WO | WO 98/28907 A2 | 7/1998 |
| WO | 98/47084 A1 | 10/1998 |
| WO | WO 99/15968 A1 | 4/1999 |
| WO | 00/20976 A2 | 4/2000 |

* cited by examiner

METHOD AND DEVICE FOR DISPLAYING INFORMATION WITH RESPECT TO SELECTED IMAGE ELEMENTS OF IMAGES OF A VIDEO SEQUENCE

BACKGROUND

The present invention relates to a method for displaying information with respect to selected image elements of images or a video sequence, a recording medium with a video sequence, with information data and criteria data for performance of the method, a device for preparation of video sequences and a recording medium and a display unit for performance of the method.

It is well known that certain image elements of static single images, in particular of Internet pages in HTML script and of window-oriented operating systems can be linked with each other. These information may for example be operating supports or links to other Internet homepages. Therefore, in the HTML-programming language, the coordinates of rectangular image fields are defined and linked with information or a link to further homepages. When the image element appears on the screen and the user navigates the cursor onto the defined rectangular image field and selects it, the stored information is shown or the Internet site, i.e. the link is effected.

When transmitting video sequences on TV, such as sport events, talk shows or serials, the spectator is often exposed to advertising messages, which pass by in the background. Therefore, for example certain objects are provided with advertising banners. Furthermore, the spectator's attention is drawn to certain products by the so-called product placement, with the products being introduced repeatedly and clearly visible in the telecast. Thereby, the spectator is massively confronted with said product.

The problem of the traditional advertising methods is the insufficient control of the advertising success. Furthermore, advertising is quite obtrusive and is poorly accepted by the spectator.

BRIEF DESCRIPTION OF THE DISCLOSURE

In an embodiment, a method for displaying information is provided that includes receiving, at a display unit: (i) a video sequence including a plurality of images in which at least some of the images include a selected image element; (ii) time trace data for controlling display of the images of the video sequence; and (iii) linking information corresponding to the selected image element. The method also includes, when displaying a series of the images of the video sequence by the display unit in accordance with the time trace data, displaying an additional signal element corresponding to the selected image element. The additional signal element is displayed in the series based on the time trace data. The additional signal element is displayed as an associated indicia and has a location adjacent to but distinct from the corresponding selected image element. The location of the additional signal element is based on a location of the corresponding selected image element and the corresponding selected image element is displayed among other selectable image elements. The additional signal element follows the selected image element as the selected image element moves in a viewable area of the display unit during the series, wherein the location of the additional signal element in the viewable area for each of the images in the series is based on the time trace data. The method also includes selecting, with an input device, the associated indicia displayed in a first image of the series distinctly from the selected image element to which the additional signal element corresponds. The method also includes obtaining, based on the selection and the time trace data corresponding to the first image of the series being displayed by the display unit when the selection is made, the linking information for the selected image element corresponding to the additional signal element. The method also includes displaying the linking information.

In an embodiment, a device for displaying information is provided that includes a reproduction unit for reproducing a video sequence including a plurality of images and displaying a series of the images of the video sequence in accordance with time trace data for controlling display of the images of the video sequence. At least some of the images of the video sequence include a selected image element and an additional signal element corresponding to the selected image element, wherein the additional signal element is displayed in the series as an associated indicia and has a location adjacent to but distinct from the corresponding selected image element. The location of the additional signal element is based on a location of the corresponding selected image element, and the corresponding selected image element is displayed among other selectable image elements. The additional signal element follows the selected image element as the selected image element moves in a viewable area of a display unit during the series, wherein the location of the additional signal element in the viewable area for each of the images in the series is based on the time trace data. The device also includes a recording unit for storing linking information corresponding to the selected image element and an input unit for selecting the associated indicia displayed in a first image of the series distinctly from the selected image element to which the additional signal element corresponds. The reproduction unit obtains, based on the selection and the time trace data corresponding to the first image of the series being displayed when the selection is made, the linking information for the selected image element corresponding to the additional signal element, and displays the linking information.

In an embodiment, a computer readable and non-transitory recording media having a program recorded therein is provided. The program is configured to receive, at a display unit: (i) a video sequence including a plurality of images in which at least some of the images include a selected image element; (ii) time trace data for controlling display of the images of the video sequence; and (iii) linking information corresponding to the selected image element. When displaying a series of the images of the video sequence by the display unit in accordance with the time trace data, the program is configured to display an additional signal element corresponding to the selected image element, wherein the additional signal element is displayed in the image series based on the time trace data. The additional signal element is displayed as an associated indicia and has a location adjacent to but distinct from the corresponding selected image element. The location of the additional signal element is based on a location of the corresponding selected image element, and the corresponding selected image element is displayed among other selectable image elements. The additional signal element follows the selected image element as the selected image element moves in a viewable area of the display unit during the series, wherein the location of the additional signal element in the viewable area for each of the images in the series is based on the time trace data. The program is also configured to receive a selection, with an input device, the associated indicia displayed in a first image of the video sequence series distinctly from the selected image element to which the additional signal element corresponds. The program is also configured to obtain, based on the selection and the time trace data corresponding to the first image of the video sequence series being displayed by the display unit when the selection is made, the linking information for the selected image element corresponding to the additional signal element. The program is also configured to display the linking information.

BRIEF DESCRIPTION OF THE DRAWINGS

Hereinafter, the invention will be disclosed more detailed in accordance with the enclosed drawings.

It is shown.

DETAILED DESCRIPTION OF THE DISCLOSURE

Figure 1:
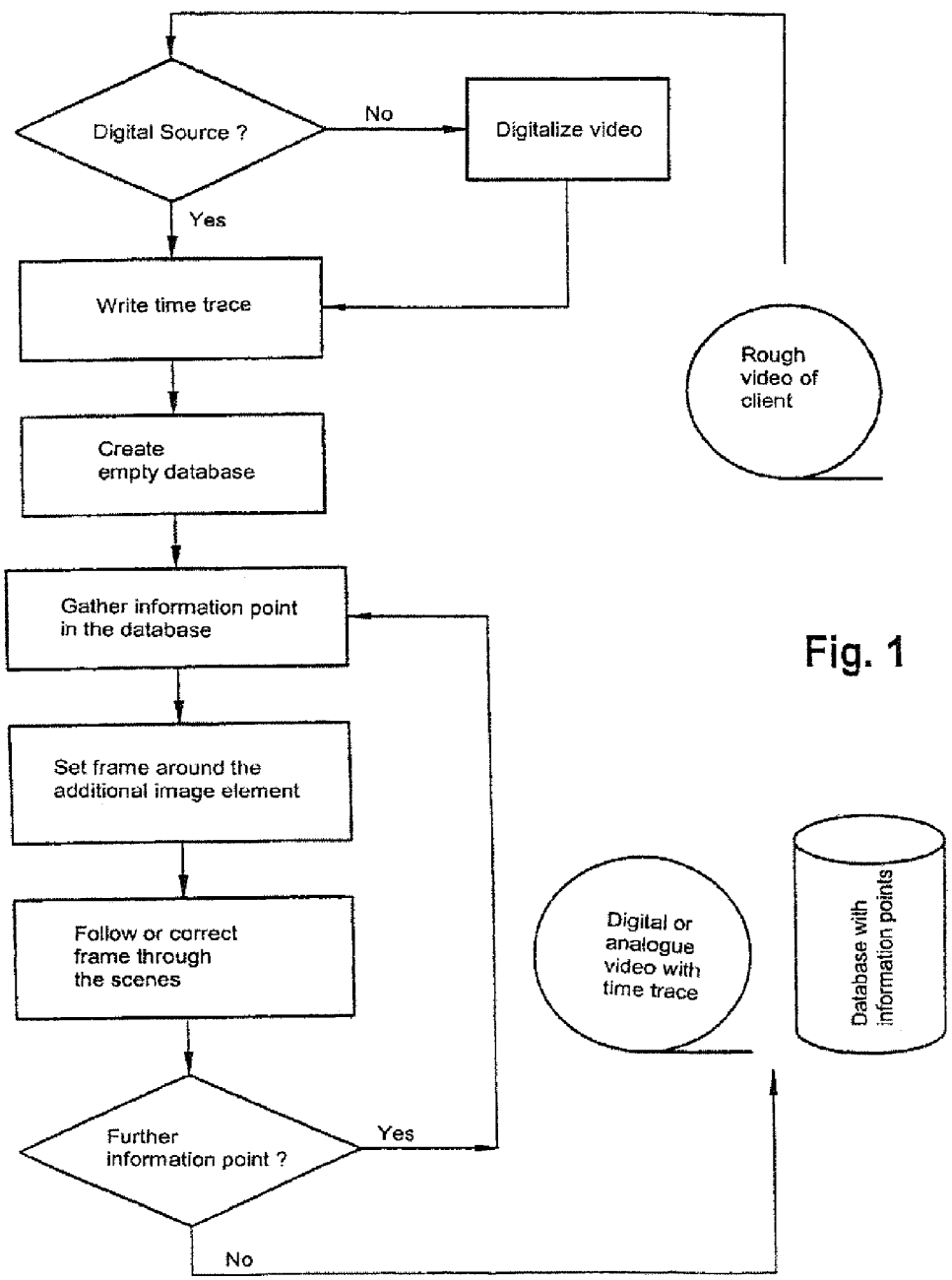
FIG. 1—a flow diagram of a first embodiment for the preparation of video sequences for performance of the method.

Thus, it is an object of the present invention to provide a method for displaying information with respect to selected image elements of a video sequence or a device for preparation of video sequences, in order to simplify and improve interactive work via the image contents of a video sequence.

Further it is an object of the invention to develop the method for displaying information with respect to selected image elements of a video sequence or a device for preparation of video sequences, in a way that improved advertising with telecasts is possible and the spectators are interactively confronted with advertising elements.

The above-mentioned objects may be solved in accordance with one or more embodiments.

Since, in accordance with the invention, the generally known method of static images, to link defined image fields with information and display them in a separate window on the display unit as soon as the image element has been selected with a cursor, has been transferred onto video sequences with a serial of slides, generally new possibilities, in particular with regard to advertising, could have been created.

Therefore, not only the traditional video sequence of the display unit, e.g. a television receiver, is transmitted. Additionally, defined information of selectable image elements are transmitted, which can be displayed after selection of the corresponding image element in a window.

Thus it will be achieved, that the traditionally available video sequences can remain unmodified up to the ultimate consumer and, furthermore, the ultimate consumer generally is free to decide to watch a video sequence, i.e. for example a television film, also without adaption, with respect to the method, of the video sequence. Depending on the embodiment of said method, the spectator thus has the possibility to traditionally satisfy his television consume. Due to said method according to the invention, it will thus be guarantied to keep traditional television habits on the one hand, and to simply switch on or switch to the interactive use. Therefore, criteria for linkage of a selected image element are transmitted with the appendant information with the video sequence.

Further preferred embodiments of the present invention are subject matter of the claims.

In accordance with an embodiment, it is advantageous, if the criteria for linkage of a selected image element are the image coordinates of the image element in the respective image, with therefore an allocation schedule being created for allocation of information to image coordinates of selected image elements in the images of the video sequence in temporal dependence of the video sequence. The data of the allocation schedule are transmitted as criteria to the display unit. However it has to be considered that, when preparing the video sequence, it must be paid attention to the fact that the position of the selectable image elements generally persistently changes. By this, the determination of the linkage of the image elements to the image coordinates becomes more expensive.

In general a video sequence can be prepared advantageously by determining a time trace or track, denoting an image field in order to define a selectable image element, the image element being searched in the subsequent images, e.g. supported by well known pattern-recognition methods and the image coordinates or the displacement vector of the image fields of the image element in the images of the video sequence, the respective time information of the time trace and the information appending the image elements being stored. By determining the time trace, a clear allocation of the image coordinates to the respective images is possible. Thereby, attention must be paid to the fact that the traditionally used video sequences of the broadcasting stations are often analogue and, if the video sequences are not respectively tagged, the image coordinates, stored in an independent data base, can later not be allocated to the individual images.

The transmittable data for allocation of the information to the image coordinates of selectable image elements can advantageously be reduced by the fact, that the course of the image coordinate of an image element is described as mathematic approximation function, which is transmitted as criteria. Therefore, the image coordinates can be described as function of the body with the coordinates x and y via time, e.g. supported by Spline functions. In this case, only the parameters of the approximation function need to be transmitted.

Advantageously, the time information of the time trace are transmitted synchronously to the video sequence and the image coordinates and respective information asynchronously. However, it is necessary to transmit the criteria of a video sequence regularly, in order to avoid allocation mistakes, which appear by a change of transmitter. The user often "zappes" expeditiously through the particular transmitters, so that a wrong or no allocation at all to the images elements is possible, if the criteria are not updated regularly.

Alternatively to the transmission of image coordinates as criteria for allocation of image elements to information it is also possible, to transmit the selectable image elements with the corresponding information to the display unit. When an image element has been selected, said element is compared to the transmitted and stored image elements, which are selectable and have information allocated. This comparison can for example be effected with known pattern-recognition procedure, which are executed in the display unit.

Advantageously, for displaying the information a window is overlain over the video sequence on the display unit.

It is particularly advantageous if the information consist of interactive elements, so that data can be transmitted from the display unit to a target computer after an image element has been selected from the images of the video sequence onto the display unit. The data and/or the target computer are hereby dependent on the information, which correspond to the selected image element. The interactive information can for example be created like an Internet link. Advantageously, input elements can be provided in the information window, in which the user, after superimposing the information window onto the display unit, can enter further data, such as his address and order information for a product corresponding to the image element. This data are transmitted to the target computer and, for example, an order is effected. Thus it is possible to use video sequences as advertising media and to perform an advertising-success control supported by interaction and to provide an order system.

Advantageously, the data transfer to the target computer can be effected via a wide-band network, an electric network, a telephone network or vial a radio and satellite network or similar.

Advantageously, the criteria for linkage of a selected image element with the corresponding information are transmitted in the blanking interval of the signal of the video sequence.

When transmitting the video sequence as digital data stream, a defined unit of the data stream is provided for the criteria and the information. For a compressed data stream in accordance with the MPEG-2-standard, data units or areas can be used, which are kept free for additional user-specific functions.

For execution of the method, information data of selected image elements of images of the video sequence and data as criteria for linkage of a selected image element with the corresponding information are stored on the traditionally known recording media.

If a selected image element is additionally transferred as so-called additional image element of the display unit, i.e. the display unit provides twice of a selected image element, it is advantageously achieved that the user is optically shown, which image element is stored with information and that he can effect the displaying of the information via additional image elements. Thus, the user can follow the video sequence unmodified and, if necessary activate the selectable image elements in the display unit, i.e. bring the additional image element onto the screen with being signalised, which image elements are stored with information.

To provide the user optically with a certain structure or orderliness it is advantageous, if additional image elements or one additional image element in form of an icon listing are provided at a predetermined place on the screen. To enable the user to follow his normal television habits, the additional image element is only superimposed when necessary.

To generally inform the user that selected image elements exist in the particular video sequence which are stored with information, it is advantageous, if this possibility of superimposition is preferably shown on the margin of the display unit or the screen with a separate hint tag, which may for example be a bar or a particularly for the user configured sign.

However, should the user prefer to watch the video sequence with tagged or marked selected image elements it may be advantageously if the user can individually determine, which image elements should be shown in the video sequence as selected images. The user might for example determine, that due to his technical interest, exclusively technical devices, for which an information is stored, are determined as additional image element, so that, due to the tagging in the video sequence he can see, which of the technical devices in the video sequence is stored with an information.

It has proved advantageously to show the additional image elements in a certain order, for example in sequence, and that the displaying of the information is effected via a corresponding digit input, which corresponds to the sequence diagram.

Should a user generally disfavour to be shown too many image elements on the display unit or on a television screen it is, in accordance with an embodiment, advantageously, if only one signal element is provided to each selected image element, which for example can follow the selected image element on the video sequence. With this measure the user is thus signalled that an image element is selectable and it can, due to the placement of the signal element clearly be determined, which image element is stored with information. Due to general habits it has proved advantageously, if the particular place is preferably determined on the right above the selected image element. Attention is drawn to the fact, that each allocation of the signal element to the selected image element is imaginable.

If furthermore, in correspondence with an embodiment, a signal element is provided with a hint tag or hint marking, e.g. a numerical digit or an integer, the user can for example select the image element by pressing the corresponding digit, in order to demand the display of the information.

If, in accordance with an embodiment, the hint tag is linked with the signal element via a connection line, it is clearly visible for the user that now the selected image element, which is linked with signal element is stored with information. However, this presentation can only be effected for a certain period, preferably one second, in order to generally avoid any disturbance in the video sequence. Furthermore it will be achieved with this measure to show the user the possibility, that selected image elements with information are provided in the special video sequence.

With the possibility to only activate the hint tag when a selected image element is provided in the video sequence, the user has the possibility to easily recognize when he can demand information to a selected image element.

A further possibility to indicate the user during the video sequence when he can obtain information is for example a pulsing and/or glancing hint tag. A pulsing and/or glancing hint tag has the particular advantage, that each time when further new selected image elements are added to the presentation of a video sequence, the hint tag or hint marking for the already existing selected image element begins to glance or pulse.

If, in accordance with an embodiment, the method is separated into different modes, different actions are imaginable within the particular modes. A first mode can, in accordance with an embodiment, be provided for displaying the signal element, with which it is possible to switch from the normal presentation of the video sequence, i.e. presentation of a film, to the activating mode, if a selected image element is provided in the video sequence. In contrast to the first mode, a second mode may be provided, which will be used for displaying first information with respect to the selected image elements. Thus, the user can twice get a general survey about the stored information with respect to a selected image element.

If, in accordance with an embodiment, in the second mode all selected image elements of a video sequence, which has been available when activating the second mode, are shown, the user will directly and simply get a total overview of the selected image elements stored with information.

Should the user show greater interest in a selected image element, more detailed second information of the selected image element can be demanded and shown by a third mode.

If, in accordance with an embodiment, the activating of the first, the second and/or the third mode or any further existing mode is effected by limited in time and/or different pressing of action buttons, a maximum success is offered to the user, in particular when he has to press the action buttons. which he usually also uses when presenting the video sequence, i.e. when watching TV.

A device for preparation of video sequences for allowing to display information of selected image elements of images of the video sequence has advantageously one reproduction unit for reproducing and displaying the video sequence, one gathering unit for selecting and gathering of image elements of images of the video sequence, one detecting unit for detecting the selected image elements in sequent images of the video sequence and for determining the respective image coordinates of the image elements and of criteria for the later linkage of image coordinates of selected image elements with information.

The display unit preferably provides of a data-processing unit for performance of the method. As data-processing unit for example a set-top box may be used, which preferably allows access to the Internet.

FIG. 1 shows a flow diagram for preparation of video sequences for performance of the method according to the invention. First, a rough video sequence of a client is digitalized, if it is available as analogue video sequence. Then a time trace is written onto the video sequence in order to allow a later allocation and choosing of image elements in dependence of time. After this an empty database is created and information are registered in said database. Therefore, the selectable image elements, which have to be linked with particular information, are framed. The frame or the image element is in this embodiment sequenced by the scenes of the video sequence and the respective image coordinates are stored in dependence of the time trace. It is advantageous, if only the alterations of the image coordinates are stored. This can save storages space. The recording of information in the database and the determination of the corresponding image coordinates is effected consecutively for each information item to register.

Thus, a digital or analogue video sequence with a time trace and a linked database with information and image coordinates, which are stored in dependence with the time trace, has been created. The video sequence is transmitted synchronously with the. time trace to a display unit, e.g. a television. Asynchronously to that, the data of the database are for example transmitted in the blanking interval of the television signal. When playing such prepared video sequence on TV, the user can select the image elements with a cursor, preferably mouse controlled. The image coordinates of the selected image element are compared with the transferred image coordinates and the corresponding information are shown, when the image coordinates match with those of an image element, for which information have been stored. Therefore, one window is opened on the screen and the information of the displayed video sequence is superimposed. It is thus possible to transfer and display background information of video sequences. Furthermore, advertising messages and order facilities can be demanded interactively by the user.

Figure 2:
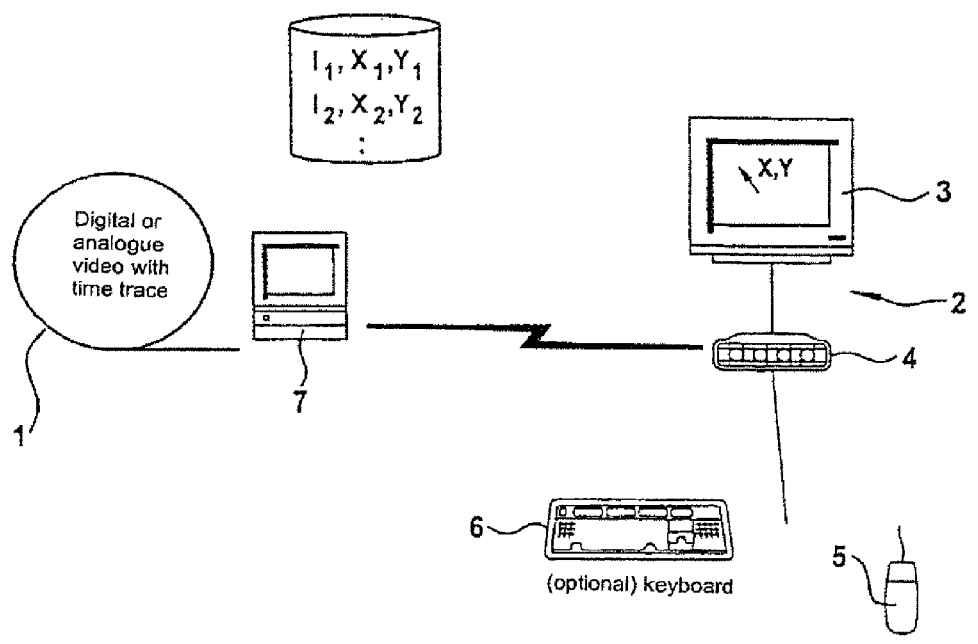
FIG. 2—a schematic block diagram of a system for performance of the method.

The method in accordance with the first embodiment is explained more detailed in the block diagram of a system for performance of the method, designed in FIG. 2. The digital or analogue video sequence 1 with the time trace is transmitted to a display unit 2, which consists of a television 3 and a data-processing unit 4. The time information is transmitted synchronously to the television signal in a hidden transmission area. Additionally, information Ii are transmitted to selectable image elements and the respective image coordinates Xi, Yi are transmitted asynchronously to the television signal to the data-processing unit 4 of the display unit and are stored there. Supported by a mouse, an infrared or radio pointer 5, a keyboard 6 or similar, the user can select image elements on the screen of TV 3. The corresponding image coordinates are transmitted to the data-processing unit 4 and compared with the stored image coordinates Xi, Yi of the selectable image elements. If the image coordinates are in the image field of selectable image elements, the linked information Ii is shown in a separate window on the screen. If this information Ii is connected with a link and an interaction has been started, a linkage to a target computer 7 is built in a central and data corresponding to information Ii, e.g. for advertising control, for order execution, etc. are transmitted to the central computer. Therefore, advantageously the Internet is used. Hereby, the data-processing unit 4 can be a so-called set-top box or similar.

Figure 3:
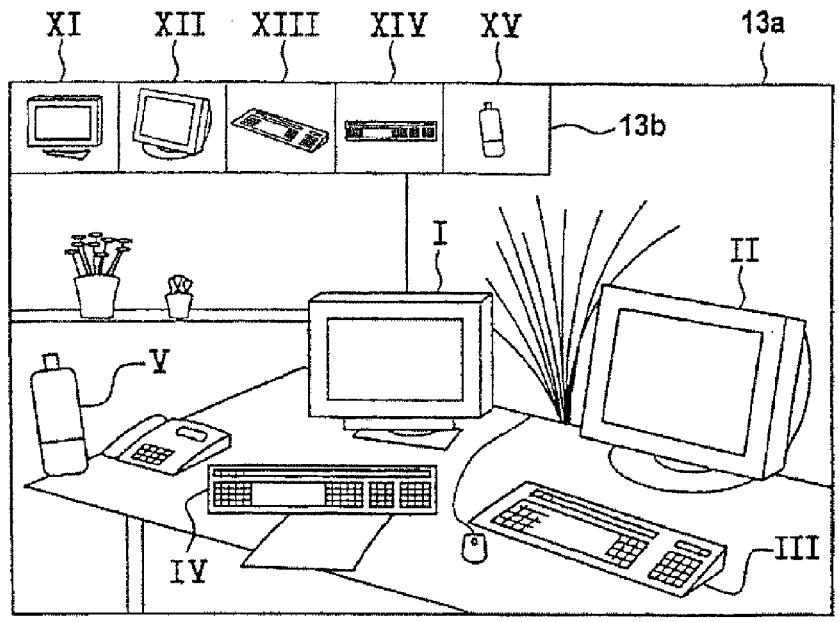
FIG. 3—shows in a second embodiment an image on the display unit, visible for the user.

In FIG. 3 a total image 13a, which is visible to the user, e.g. of the display unit 3 of FIG. 2 is shown, as it may appear in accordance with a second embodiment. The total image 13a shows a video sequence with a plurality of image elements, within this example appearing five selected image elements I, II, III, IV and V. At a suitable position on the display image 13a an icon listing is provided, in which the selected image elements I, II, III, IV and V are illustrated as additional image elements XI, XII, XIII, IX and XV. Due to this allocation, the user is signalled via the additional image elements XI, XII, XIII, IX and XV, which of the image elements I, II, III, IV and V appearing in the video sequence are selectable to display the stored information. It is drawn attention to the fact, that the icon listing can also be superimposed or overlain or faded-in and that in particular this possibility of superimposing can be superimposed for example by a special movement of a mouse or hand-control element. This presentation also shows, that for example the user, should he wish to get the information to the additional image element XIII, due to position 3 in the icon list, could demand the stored information for example by pressing no. 3, e.g. on the teleguidance, which is then displayed for example as superimposed window also on the display unit (not shown). The principle basing on this second embodiment is, that during the audio-video transmission an icon listing 13b is superimposed with the additional image elements XI, XII, XIII, IX and XV as the selectable image elements. This icon listing depends on the support of an input device, (e.g. mouse, cursor button, control pad, teleguidance elements, radio pointer, etc.) the additional image element being selected and depending on the selection of an action, e.g. order, ordering information, etc, i.e. display the respective information. For the realization of this concept only the additional image element needs to be transmitted, and the time, when said additional image element, i.e. by means of the corresponding time trace of the video sequence is visible. A transmission of for example the image coordinates of selected image elements in the images of the video sequence, which correspond to the image elements of the image transmission is thus not necessary, and no so-called hot spots need to be transmitted.

Figure 4:
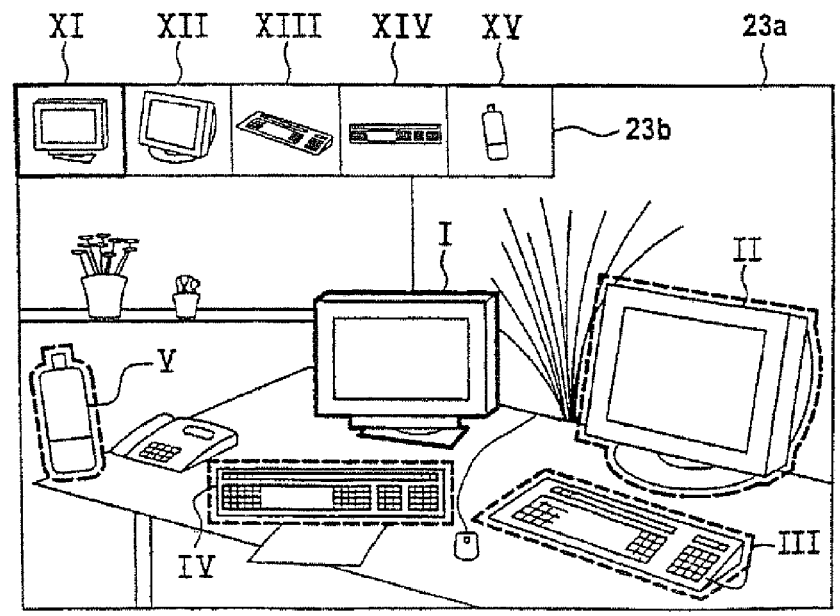
FIG. 4—shows in a third embodiment an image on the display unit, visible for the user.

In FIG. 4 a third embodiment of the present invention is shown, which essentially uses the same presentation mechanics for the selected image elements as the second embodiment. A display image 23a is shown, which also shows selected image elements I, II, III, IV and V and an icon listing 23b with the additional image elements XI, XII, XIII, IX and XV. Opposite to the second embodiment, now the selected image elements I to V are provided with a tag or marking in form of a selection frame, to allow the user to discern, in addition to the icon listing 23b in the display image, which image element is activated or stored with information. Furthermore it is possible to provide the currently selectable selected image element e.g. I with one opposed to the other selected image element with another selection frame, e.g. thicker frame contour or other colours, with the corresponding additional image element, here XI, also being optically highlighted in contrary to the other additional image elements II to V. Due to this highlighting it is granted, that the user can only demand the stored information of the selected or additional image element with a generally defined user-button, e.g. the "OK" button of the teleguidance. However, for this method additionally the frames for the selected image elements and its coordinates need to be transmitted, but no so-called Hot-Spots are transmitted or any actions depend on those Hot-Spots. If the additional image elements are reproduced in correspondence with the icon listing shown in FIG. 4, for example the user can only select with a corresponding "right-left" button in the icon listing the interesting additional image element and demand it respectively with the general input button. The activating of the selected image element does thus not effect via so-called Hot-Spots but only via the additional image elements XI to XV.

Figure 5:
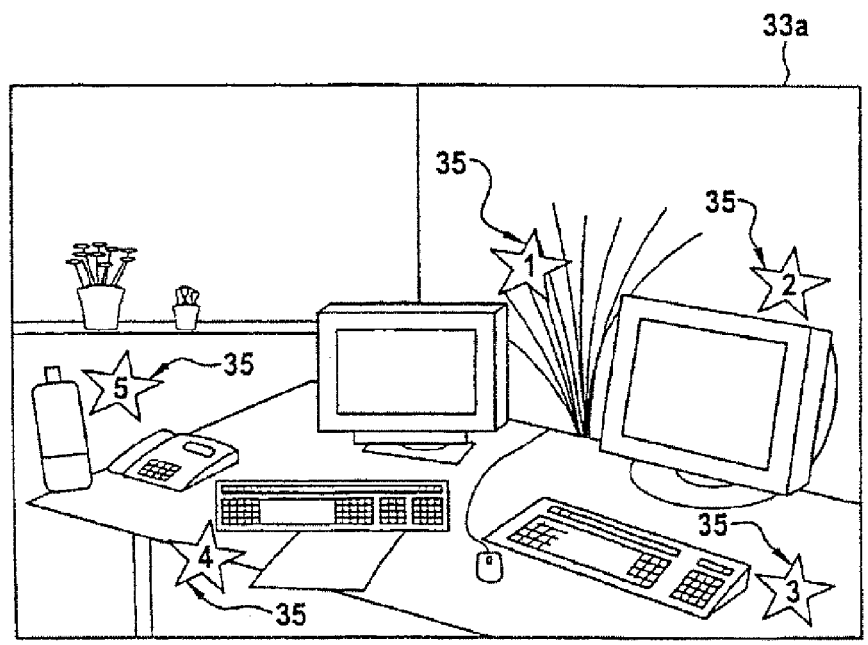
FIG. 5—shows in a fourth embodiment an image on the display unit, visible for the user.

In FIG. 5 a fourth embodiment of the present invention is shown. In this embodiment another display image of display unit 3 is shown, in which again selected image elements I to V are visible. In this embodiment a signal element 35 is provided for each selected image element I to IV, with each signal element 35 being provided with a hint tag or hint marking, e.g. a digit or letters which can directly be selected, with pressing of the respective digit of the letter, the stored information of the selected image element being shown. For this method only the coordinates of the signal elements need to be transmitted, which for example may depend on the image coordinates of the selected image elements. The displaying of the information, which is allocated to the selected image element, thus depends on the activating of a separate input device and, again, no so-called Hot-Spot is used. It is pointed out that the optical preparation can be contrasted similarly as in the third embodiment by highlighting, i.e. possibly by different border margins or colorations.

Furthermore it shall be pointed out that the respective method of first to fourth embodiment can also concurrently be used and combined, so that a manifold presentation possibility is given to the user. Subsequent to the third embodiment, in which the selected image elements are provided with a selection frame, it shall be pointed out that the so-called transparent GIF-image formats can be transmitted separately to the display unit, which can be exactly as large as the display unit 13a to 33b and have the selection frame for the selected image element at an appropriate position or predetermined coordinates. It is thus possible to save the transmission of image coordinates, so that only over the time trace corresponding to the image format and respective selected image elements the display of information is allowed.

Thus, said method and device allow a product placement of telecasts with active advertising-success control. Furthermore, information for an image element can be connected with a link, so that after selection of the image element an order of the product presented in the image of the video sequence is possible online via data transfer.

If the user favours a product which is shown in the video sequence, such as a garment, he can select said product with the mouse and get the information of said product, such as name and address of the producer, price, quality etc. Now a further information field is selectable, which allows the user to enter order data and order the product directly from the producer. Therefore, the order information are transferred to the provider via a back channel, i.e. via broadband, electric, radio or satellite network or supported by a telephone connection, who arranges the dispatch and the invoicing for the product.

Thus, very inconspicuous advertising is possible, which additionally uses the curiosity of the spectator. Furthermore an advertising-success control is also possible for the product placement.

Figure 6:
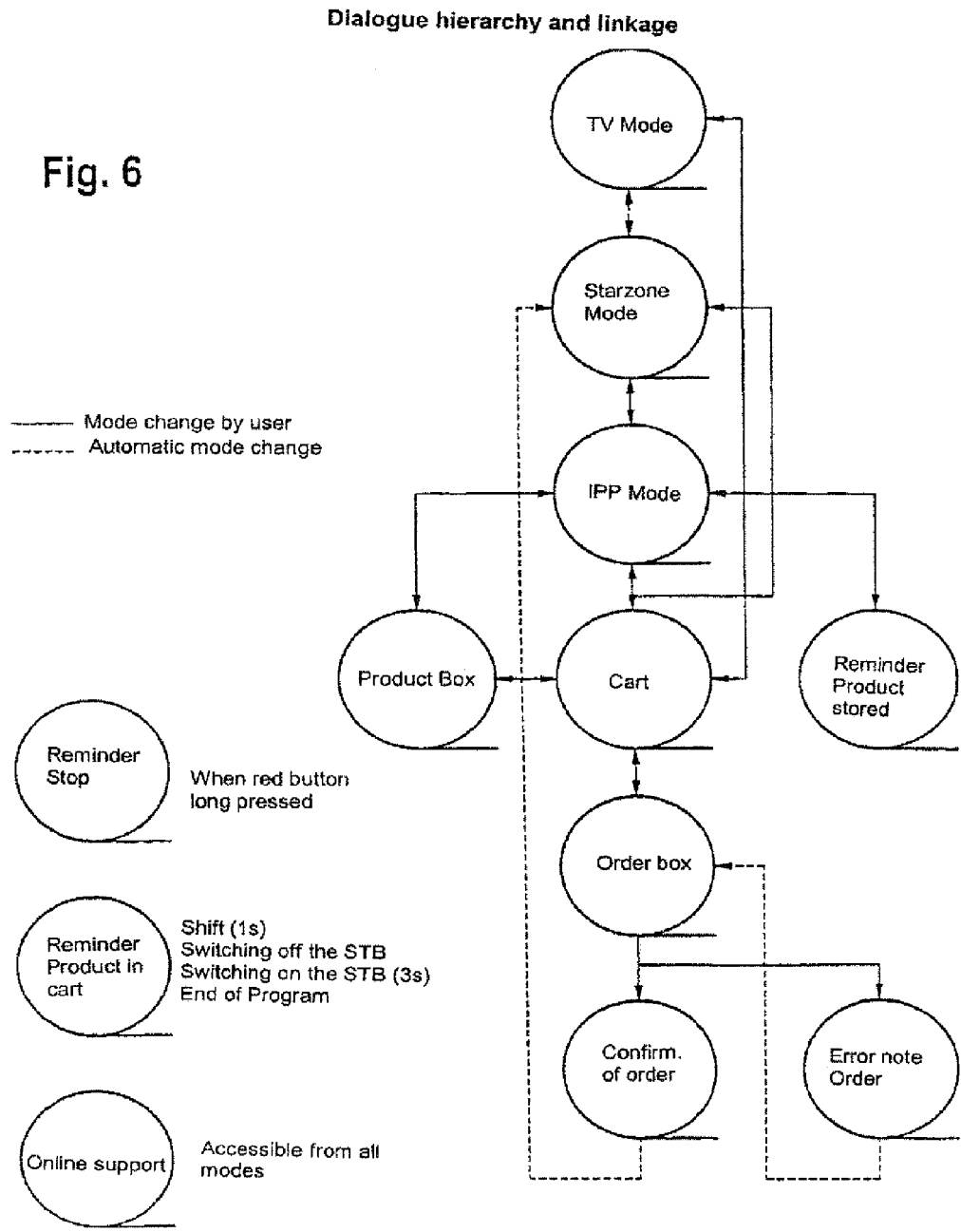
FIG. 6—shows a schematic block diagram of a device for performance of the method in accordance with a fifth embodiment.
Figure 7:
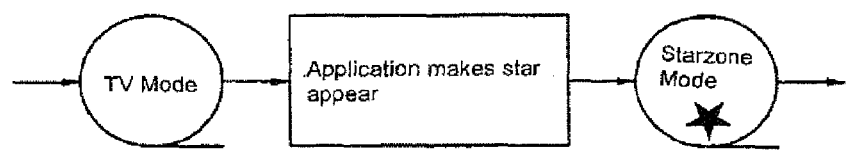
FIG. 7—schematically shows the transition between the normal operating mode and the first mode in accordance with the fifth embodiment.

Finally, the functionality of the method or device in accordance with the fifth embodiment shall be shown more detailed supported by FIGS. 6-13. As shown in FIG. 6, the method or device use different modes, with allowing to change from one general operating mode, i.e. TV mode to another mode, which activates the hint tags e.g. in shape of a star, the so-called Starzone mode (see FIG. 7). Depending on the actuating of the action button it is possible to change from the Starzone mode into the first mode, i.e. IPP mode, in which the signal element to a selected image element is activated. From the first mode, i.e. IPP mode, it is now possible to change into a second mode, which for example contains a cart, also by actuating of an action button or other action measures. Furthermore it is also possible to directly change from the first mode into a third mode, which shows more detailed information of the selected image elements. However it is also possible to change from the second mode into the third mode. As clearly shown in FIG. 6 it is also possible to change by a special operating measure from the operating mode, i.e. TV mode and/or the Starzone mode directly in the cart of the second mode. It has proved advantageously, that the order could not have been effected, if from the cart of the second mode firstly is changed into a so-called order box, from which either a confirmation of order or an error hint has been received.

Furthermore it is advantageously, that, if from the first mode it is changed into a mode, the user is signalled that the information corresponding to the selected image element have already been activated, e.g. that the product corresponding to the selected image element is already registered.

Figure 8:
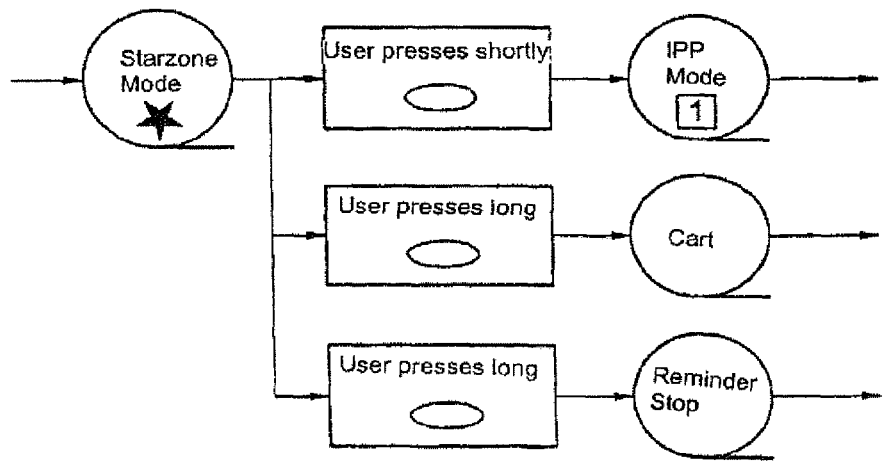
FIG. 8—shows the transition between the first mode and the second mode in accordance with the fifth embodiment.
Figure 9:
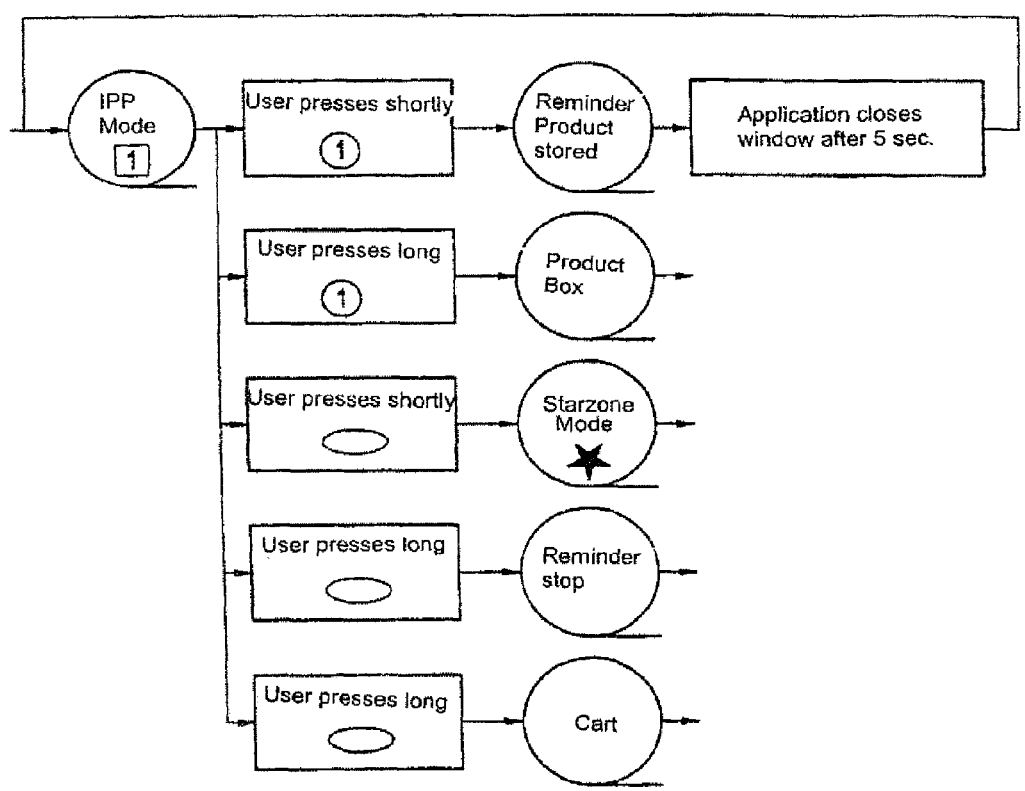
FIG. 9—schematically shows the operational mode of the second mode.

FIG. 8 shows the possibilities to change from the so-called Starzone mode into the first and second modes by different actuating of action measures. If the system is in the Starzone mode, it is for example possible to change into the IPP mode, i.e. the first mode, by shortly pressing a certain button, e.g. a button green. If for example the user presses the same button, i.e. button green longer, the system will change into the cart, as shown in FIG. 8. In the IPP mode, i.e. first mode, the selected image elements are stored with information, with a particular signal element pursuing the respective selected image element during the current operating mode or consecutively sequencing video sequences. When pursuing the signal elements with the selected image elements, two different variations can be used. In the first variation, the signal element is stuck to the selected image element and thus skips at a scene change of different video sequences. At a second variation, the signal element is softly drawn at a scene change. This means, that, at a scene change by animation, the digit or integer is newly placed at the selected image element or at the predetermined position corresponding to the image element.

In the IPP mode (see FIG. 9) the user has now the possibility to store the selected image element and the respective information in a separate data storage by respective pressing of an activating button, which corresponds to a signal element. If the user desires for example detailed information of a selected image element, he can, by pressing an action button corresponding to the signal element of the selected image element, directly change for example into the third mode, which consists of a product box. If the user desires to leave the IPP mode, he can return to an action button corresponding to the signal element into the Starzone mode. If he for example presses the action button longer, the complete system is interrupted. If he presses an action button different to the mentioned action button, he can for example directly change into the second mode, which consists of the cart.

Figure 10:
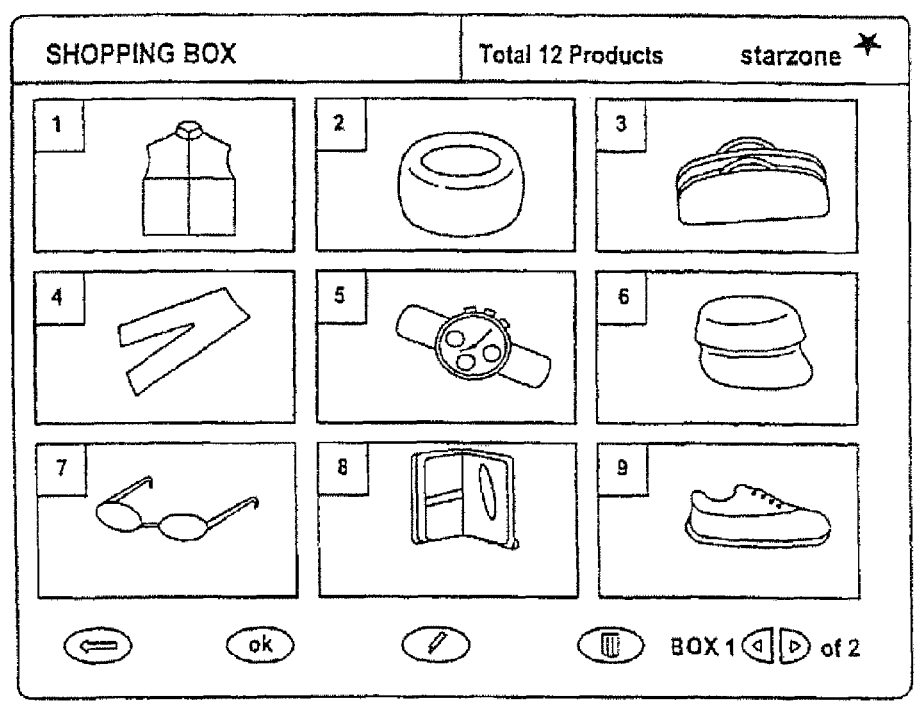
FIG. 10—exemplarily shows the possible presentation of the first information in the second mode, in accordance with the fifth embodiment.
Figure 11:
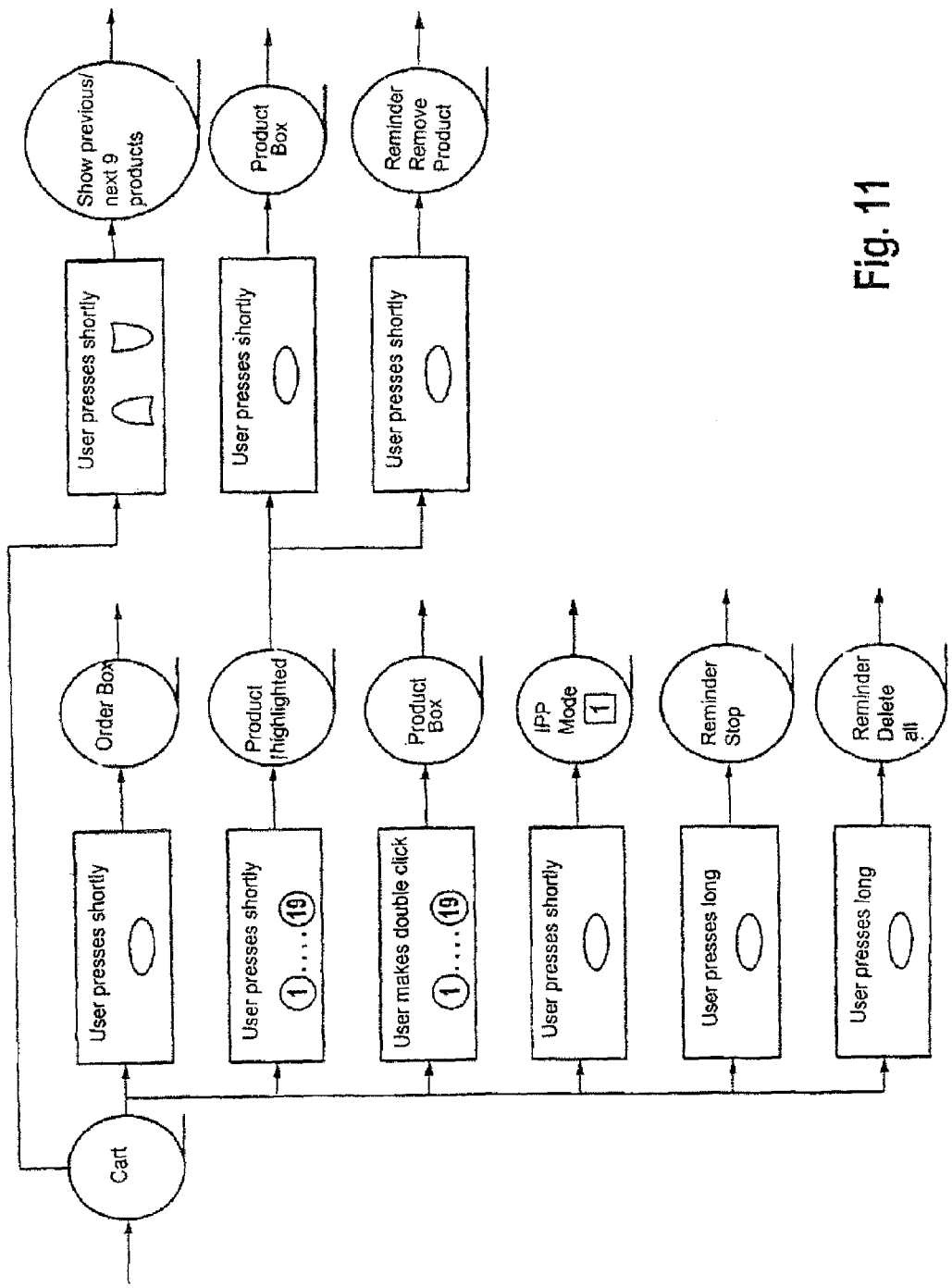
FIG. 11—schematically shows the operational mode of the third mode.

FIGS. 10 and 11 schematically show the different possibilities with respect to the second mode, which consists of the cart, and the presentation of first information with respect to the selected image elements. In FIG. 10 the selected image elements of the IPP mode are preferably listed tabularly or shown in the so-called cart. Each selected image element is allocated for example a digit or integer, which can be demanded consecutively. In this connection it is pointed out, that the selected image elements can be shown in dependence of the status, with the following states being differed. Firstly those selected image elements, which have not been stored with further information, e.g. order information such as size, etc, and those selected image elements, which have been stored with further information, such as order information. The latter information elements can for example be highlighted in colour. If the user selects one of the digits allocated to the selected image elements, this selected image element is highlighted in colour. Depending on the actuating of the action button, the product box of the third mode opens or the selected image element is deleted from the cart. Referring to this it is also possible to provide further action measures, which for example open the product box. If the user presses for example a different action button in addition to the former action button, for example the order box opens. It is pointed out to the fact, that the action button remains inactively until the respective information of the selected image element has been entered by the user. If the user shortly presses for example a further action button in addition to the above-mentioned, the system changes back into the IPP mode. However, it is also possible to interrupt the system by further different action measures. As a safety measure it is for example possible to provide a further action button, which needs to be pressed to delete selected image elements.

Figure 12:
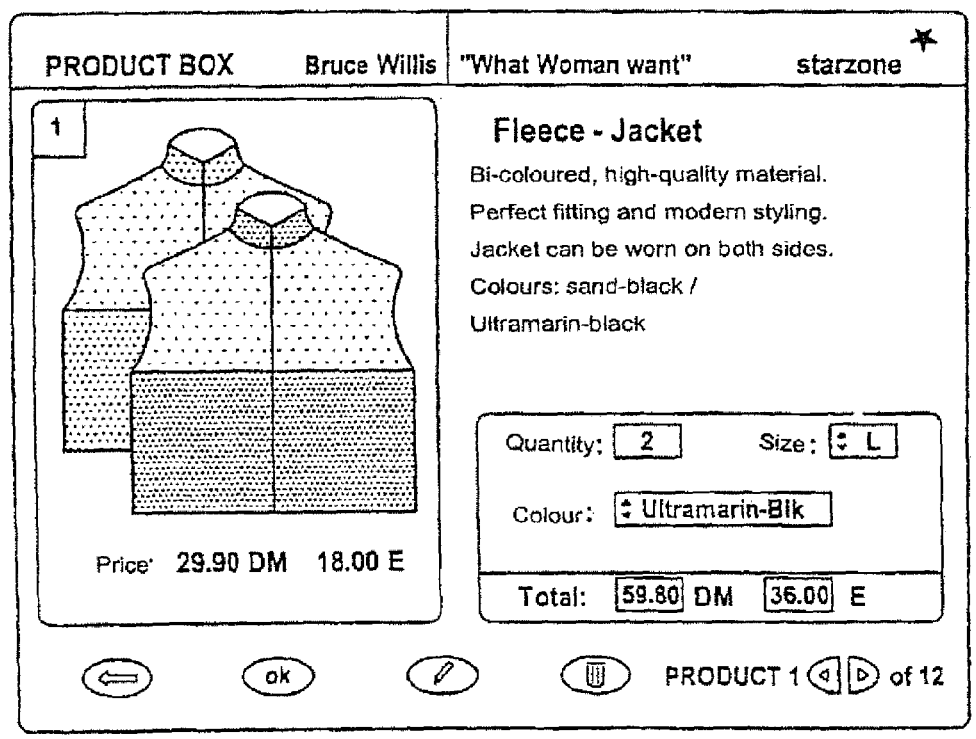
FIG. 12—exemplarily shows second, more detailed information in the third mode.
Figure 13:
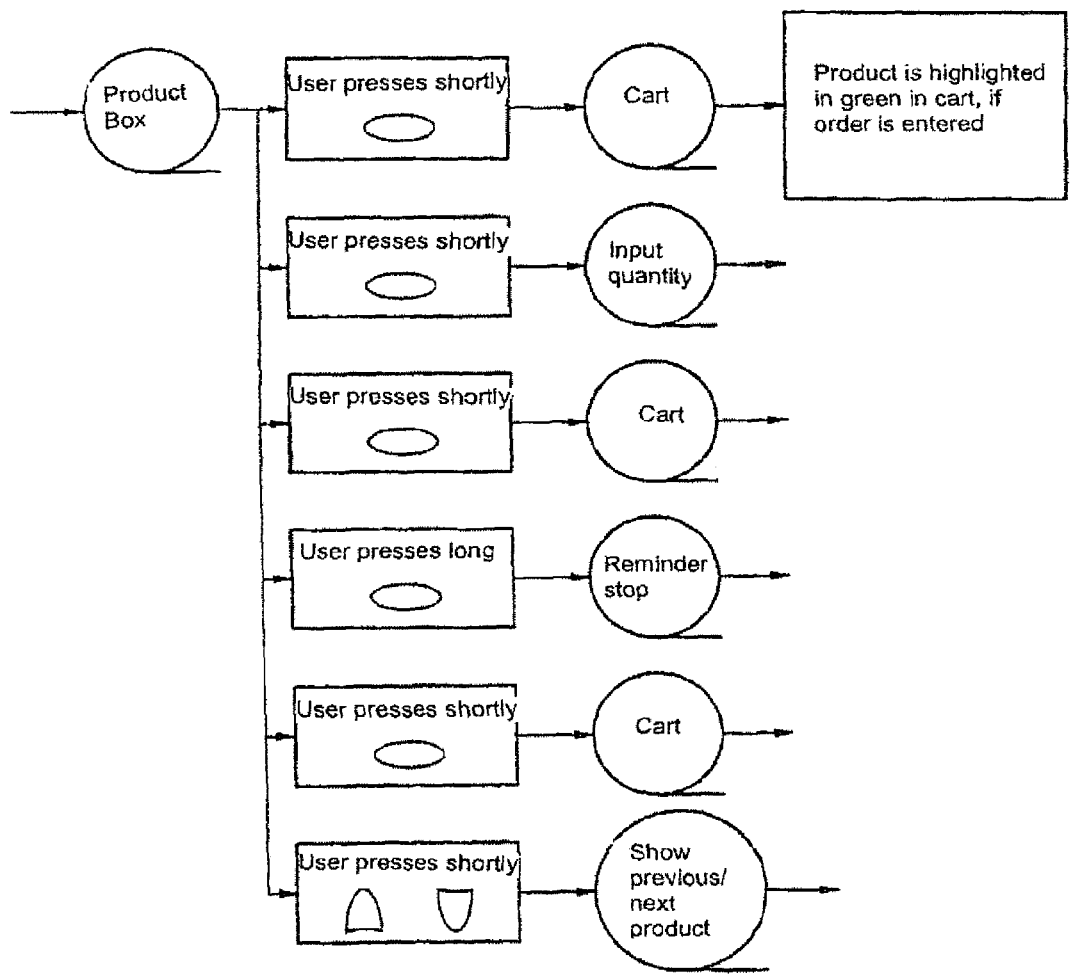
FIG. 13—schematically shows the operational mode of the third mode.

In FIG. 12 the product box, which is allocated to the third mode is shown, with the possible action inputs being shown schematically in FIG. 13. As it can be taken from FIG. 12, in the third mode two more detailed information of selected image elements are shown. If the user presses a certain action button, the respective input unit can be highlighted in colour, with the user then being able to enter the respective information. If the user presses a further action button, it is possible to re-skip for example in the second mode, which consists of the cart, and the order information are adopted. If the user presses a different action button additionally to the above-mentioned action button, he can for example also be lead into the second mode, but the information are not adopted. By pressing of further action buttons, the third mode can be interrupted or the selected image element can be deleted from the cart in accordance with the second mode.

FIG. 13 shows the further possibilities, how further information can be entered by different action buttons.

Figure 14:
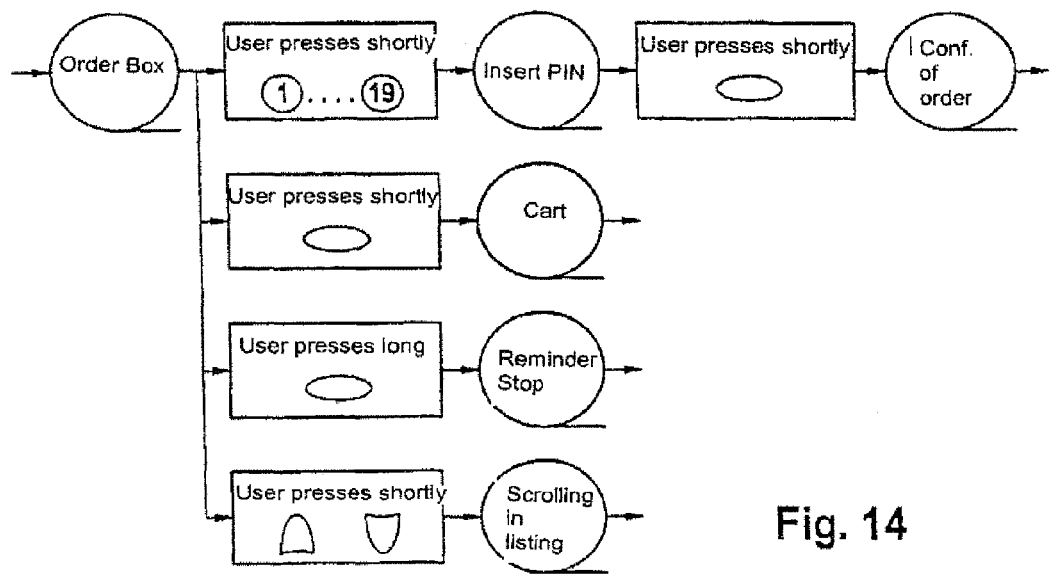
FIG. 14—schematically shows an operating system of an order box.

FIG. 14 shows the operating system of the order box, with additionally pointing out, that the order box is operated with a security code, in order to avoid involuntary activating of information, i.e. orders. If the information or orders have been effected, the user is signalled by a confirmation of order, that finally the interactivity is finished.

Basically it is also possible to support each individual method step with an online support.

The invention claimed is:

1. A computer readable and non-transitory recording media having a program recorded therein, the program configured to:
    receive, at a display unit: (i) a video sequence including a plurality of images in which at least some of the images include a selected image element; (ii) time trace data for controlling display of the images of the video sequence; and (iii) linking information corresponding to the selected image element;
    when displaying a series of the images of the video sequence by the display unit in accordance with the time trace data, displaying an additional signal element corresponding to the selected image element, wherein the additional signal element is displayed in the series based on the time trace data, the additional signal element being displayed as an associated indicia and having a location adjacent to but distinct from the corresponding selected image element, wherein the location of the additional signal element is based on a location of the corresponding selected image element and the corresponding selected image element is displayed among other selectable image elements, wherein the additional signal element follows the selected image element as the selected image element moves in a viewable area of the display unit during the series, wherein the location of the additional signal element in the viewable area for each of the images in the series is based on the time trace data;
    receive a selection, with an input device, of the associated indicia displayed in a first image of the series distinctly from the selected image element to which the additional signal element corresponds;
    obtain, based on the selection and the time trace data corresponding to the first image of the series being displayed by the display unit when the selection is made, the linking information for the selected image element corresponding to the additional signal element; and
    display the linking information.

2. A method for displaying information comprising:
    receiving, at a display unit: (i) a video sequence including a plurality of images in which at least some of the images include a selected image element; (ii) time trace data for controlling display of the images of the video sequence; and (iii) linking information corresponding to the selected image element;
    when displaying a series of the images of the video sequence by the display unit in accordance with the time trace data, displaying an additional signal element corresponding to the selected image element, wherein the additional signal element is displayed in the series based on the time trace data, the additional signal element being displayed as an associated indicia and having a location adjacent to but distinct from the corresponding selected image element, wherein the location of the additional signal element is based on a location of the corresponding selected image element and the corresponding selected image element is displayed among other selectable image elements, wherein the additional signal element follows the selected image element as the selected image element moves in a viewable area of the display unit during the series, wherein the location of the additional signal element in the viewable area for each of the images in the series is based on the time trace data;
selecting, with an input device, the associated indicia displayed in a first image of the series distinctly from the selected image element to which the additional signal element corresponds;
obtaining, based on the selection and the time trace data corresponding to the first image of the series being displayed by the display unit when the selection is made, the linking information for the selected image element corresponding to the additional signal element; and
displaying the linking information.

3. The method in accordance with claim 2 further comprising:
superimposing a window over the video sequence for displaying the linking information for the selected image element.

4. The method in accordance with claim 2 further comprising:
transmitting data to a target computer based on the selection, wherein at least one of the data or the target computer depends on the linking information corresponding to the selected image element.

5. The method in accordance with claim 2 further comprising:
transmitting criteria for linking the selected image element with the linking information in a blanking interval of the video sequence.

6. The method in accordance with claim 2 further comprising:
transmitting criteria for linking the selected image element with the linking information in a defined area of the video sequence, wherein the video sequence is a digital video-data stream.

7. The method in accordance with claim 2 further comprising:
superimposing the associated indicia into the first image displaying the selected image element.

8. The method in accordance with claim 2, further comprising a plurality of the additional signal elements and a plurality of the selected image elements, each of the additional signal elements corresponding to a separate one of the selected image elements, wherein the associated indicia of the additional signal elements have a common shape and are shown simultaneously in the image.

9. The method in accordance with claim 2, wherein the additional signal element is displayed in the first image above the corresponding selected image element.

10. The method in accordance with claim 2, wherein one first mode is provided for displaying the additional signal element.

11. The method of claim 2, wherein the selected image element is a commercial product in the video sequence and the associated indicia is a tag or marking that notifies a viewer that the product is selectable among the other selectable image elements in the video sequence, the tag or marking being displayed for a designated period of time in the video sequence.

12. The method of claim 2, wherein the associated indicia is displayed for a designated period of time in the video sequence, the designated period of time being less than a time that the selected image element is displayed in the video sequence.

13. The method of claim 2, wherein displaying the video sequence includes displaying an icon listing in which an additional image element illustrating the selected image element is displayed, wherein the icon listing is displayed in the corresponding image distinctly from the selected image element.

14. The method of claim 2, wherein the selected image element corresponds to a product displayed in the video sequence, the additional signal element being a tag or marking that notifies a viewer that the selected image element is selectable among the other selectable image elements in the video sequence.

15. The method of claim 2, wherein the associated indicia is at least one of a number or shaped tag that notifies a viewer that the selected image element is selectable among the other selectable image elements in the video sequence.

16. The method in accordance with claim 4, wherein the transmission of data to the target computer is effected via a broad-band network, an electric network, a telephone network, or a radio or satellite network.

17. The method in accordance with claim 7, wherein the additional signal element includes a separate hint marking.

18. The method in accordance with claim 9, wherein the associated indicia constitutes a hint marking.

19. The method in accordance with claim 18, wherein the hint marking is linked to the selected image element for a designated period of time via a connection line.

20. The method in accordance with claim 18, wherein the hint marking is only activated when the displayed image includes the selected image element.

21. The method in accordance with claim 20, wherein the activation of the hint marking is shown via at least one of pulsing or blinking hint marking.

22. The method in accordance with claim 10, wherein a second mode is provided for displaying the linking information corresponding to the selected image element.

23. A device for displaying information comprising:
a reproduction unit for reproducing a video sequence including a plurality of images and displaying a series of the images of the video sequence in accordance with time trace data for controlling display of the images of the video sequence, wherein at least some of the images of the video sequence include a selected image element and an additional signal element corresponding to the selected image element, wherein the additional signal element is displayed in the series as an associated indicia and has a location adjacent to but distinct from the corresponding selected image element, wherein the location of the additional signal element is based on a location of the corresponding selected image element and the corresponding selected image element is displayed among other selectable image elements, wherein the additional signal element follows the selected image element as the selected image element moves in a viewable area of a display unit during the series, wherein the location of the additional signal element in the viewable area for each of the images in the series is based on the time trace data;
a recording unit for storing linking information corresponding to the selected image element; and
an input unit for selecting the associated indicia displayed in a first image of the series distinctly from the selected image element to which the additional signal element corresponds;

wherein the reproduction unit obtains, based on the selection and the time trace data corresponding to the first image of the series being displayed when the selection is made, the linking information for the selected image element corresponding to the additional signal element, and displays the linking information.

24. The device in accordance with claim 23 wherein the device is configured to display a window over the video sequence that shows the linking information of the selected image element.

25. The method of claim 11, wherein the designated period of time is one second.

26. The method of claim 13, wherein the selected image element corresponds to a product displayed in the video sequence, the additional image element of the icon listing being an image of the product, the additional image element and the selected image element being displayed simultaneously for at least a designated period of time.

* * * * *